(12) United States Patent
Komaba

(10) Patent No.: US 11,961,518 B2
(45) Date of Patent: Apr. 16, 2024

(54) CONTROL DEVICE, CONTROL METHOD AND PROGRAM FOR PLANETARIUM

(71) Applicant: KONICA MINOLTA PLANETARIUM CO., LTD., Tokyo (JP)

(72) Inventor: Kenichi Komaba, Tokyo (JP)

(73) Assignee: KONICA MINOLTA PLANETARIUM CO., LTD., Tokyo (JP)

( * ) Notice: Subject to any disclaimer, the term of this patent is extended or adjusted under 35 U.S.C. 154(b) by 420 days.

(21) Appl. No.: 17/289,113

(22) PCT Filed: Nov. 12, 2019

(86) PCT No.: PCT/JP2019/044295
§ 371 (c)(1),
(2) Date: Apr. 27, 2021

(87) PCT Pub. No.: WO2020/100878
PCT Pub. Date: May 22, 2020

(65) Prior Publication Data
US 2022/0013116 A1    Jan. 13, 2022

(30) Foreign Application Priority Data
Nov. 13, 2018   (JP) ................................ 2018-213024

(51) Int. Cl.
*G10L 15/22*        (2006.01)
*G06F 40/157*       (2020.01)
(Continued)

(52) U.S. Cl.
CPC ............ *G10L 15/22* (2013.01); *G06F 40/157* (2020.01); *G09B 27/04* (2013.01); *G10L 15/26* (2013.01); *G10L 2015/223* (2013.01)

(58) Field of Classification Search
CPC ... G10L 15/22; G10L 15/26; G10L 2015/223; G06F 40/157; G09B 27/04
(Continued)

(56) References Cited

U.S. PATENT DOCUMENTS 9,560,224 B2 * 1/2017 Komaba ............ H04N 1/00392
10,027,842 B2 * 7/2018 Haba .................. H04L 63/0492
(Continued)

FOREIGN PATENT DOCUMENTS

JP      11-296073 A      10/1999
JP      2015-158563 A     9/2015

OTHER PUBLICATIONS

International Search Report (ISR) dated Jan. 21, 2020 filed in PCT/JP2019/044295.

*Primary Examiner* — Susan I McFadden
(74) *Attorney, Agent, or Firm* — RANKIN, HILL & CLARK LLP

(57) ABSTRACT

Provided is a quick-responsive voice control technique even in use in a planetarium. A control device of a projector of a planetarium includes: a storage unit that stores a plurality of commands for controlling the projector, flags indicating whether or not the respective commands can be executed, and keywords associated with the respective commands; a voice acquisition unit that acquires voice data; a control unit that controls the control device; and a communication unit that communicates with the projector. The control unit determines whether or not each of the commands for the projector can be executed on the basis of state information of the projector, the state information being acquired through the communication unit, updates the flags on the basis of the determination result, generates character string information from voice data acquired by the voice acquisition unit, acquires a command in which an executable flag
(Continued)

is set from the storage unit using the character string information as a search key, and transmits the acquired command to the projector.

15 Claims, 11 Drawing Sheets

(51) Int. Cl.
    *G09B 27/04*     (2006.01)
    *G10L 15/26*     (2006.01)

(58) Field of Classification Search
    USPC .......................................................... 704/275
    See application file for complete search history.

(56) References Cited

U.S. PATENT DOCUMENTS

| | | | |
|---|---|---|---|
| 10,333,731 B2 * | 6/2019 | Ebrom | ................ H04L 12/2816 |
| 11,025,447 B2 * | 6/2021 | Ebrom | ................ H04L 12/2818 |
| 11,373,650 B2 * | 6/2022 | Suzuki | ...................... G06F 3/14 |

* cited by examiner

| EXECUTION COMMAND | CORRESPONDING PROJECTOR INFORMATION | EXECUTABLE/ NON-EXECUTABLE FLAG |
|---|---|---|
| TIME MOVEMENT | — | ENABLED |
| LIGHTING OF ORION | ORION CONSTELLATION PICTURE PROJECTOR | ENABLED |
| LIGHTING OF SCORPIO | SCORPIO CONSTELLATION PICTURE PROJECTOR | DISABLED |
| DSCHUBBA LIGHT CHANGE MODE ON | FIXED STAR PROJECTOR EXCLUSIVELY FOR DSCHUBBA | DISABLED |
| ALL FIXED STARS LIGHTING OFF | FIXED STAR PROJECTOR | ENABLED |
| BETELGEUSE ON | FIXED STAR PROJECTOR EXCLUSIVELY FOR BETELGEUSE | ENABLED |

| RECOGNITION WORD | EXECUTION COMMAND | SEARCH ENABLED FLAG |
|---|---|---|
| LOOK AT ORION | TIME MOVEMENT | ENABLED |
| LOOK AT ORION | LIGHTING OF ORION | ENABLED |
| LIGHT SCORPIO | LIGHTING OF SCORPIO | DISABLED |
| DSCHUBBA LIGHT CHANGE ON | DSCHUBBA LIGHT CHANGE MODE ON | DISABLED |
| LIGHT ONLY BETELGEUSE | ALL FIXED STARS LIGHTING OFF | ENABLED |
| LIGHT ONLY BETELGEUSE | BETELGEUSE ON | ENABLED |

| RECOGNITION WORD | EXECUTION COMMAND | SEARCH ENABLED FLAG |
|---|---|---|
| LOOK AT ORION | TIME MOVEMENT | ENABLED |
| LOOK AT ORION | LIGHTING OF ORION | ENABLED |
| LIGHT ONLY BETELGEUSE | ALL FIXED STARS LIGHTING OFF | ENABLED |
| LIGHT ONLY BETELGEUSE | BETELGEUSE ON | ENABLED |

701 / 702 / 703

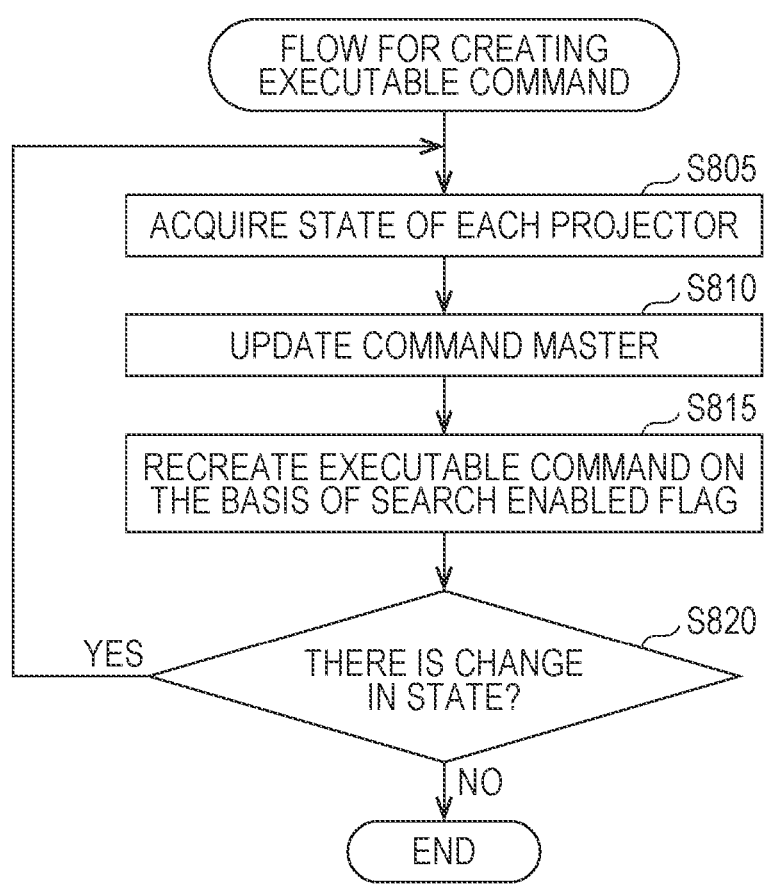

CONTROL DEVICE, CONTROL METHOD AND PROGRAM FOR PLANETARIUM

TECHNICAL FIELD

The present disclosure relates to control of a planetarium, and more specifically to control of a planetarium by voice input.

BACKGROUND ART

A planetarium projects constellations and star motion on a dome-shaped curved screen with a projector. Usually, a commentator advances a projection scene by operating the planetarium while explaining constellations and the like projected by a projector.

Examples of a method for operating the planetarium include an operation using a console apparatus. A commentator can control the planetarium in detail by using the console apparatus. Meanwhile, the console apparatus includes many operation items, and therefore has a disadvantage that an operation thereof is complicated. Therefore, use of the console apparatus is burdensome for the commentator because it is necessary to remember not only commentary contents but also operation contents of the console apparatus.

Therefore, in order to reduce the burden on the commentator and smoothly advance a projection program of the planetarium, there is a demand for a technique of performing voice control on the planetarium on the basis of voice information when the commentator explains.

Regarding voice control of the planetarium, for example, JP H11-296073 A (Patent Literature 1) discloses a system of operating a planetarium theater "including a means for recognizing and executing a voice operation command and a means for performing a voice operation guidance in a system of operating a planetarium theater" (paragraph [0007]).

In addition, regarding another kind of voice control, for example, JP 2015-158563 A (Patent Literature 2) discloses a data input device that provides "a data input device that does not require utterance of already input words and narrows down recognition target words to improve the accuracy of voice recognition ([Abstract]).

CITATION LIST

Patent Literature

Patent Literature 1: JP H11-296073 A
Patent Literature 2: JP 2015-158563 A

SUMMARY OF INVENTION

Technical Problem

According to the techniques disclosed in Patent Literatures 1 and 2, when a target that can be searched for by voice changes depending on a situation, a delay in response may occur. Therefore, a quick-responsive voice control technique even in use in a planetarium where a situation changes from moment to moment is required.

The present disclosure has been achieved in view of the above background, and an object in an aspect is to provide a quick-responsive voice control technique even in use in a planetarium.

Solution to Problem

A control device that controls a projector of a planetarium according to an embodiment includes: a storage unit that stores a plurality of commands for controlling an operation of the projector, flags indicating whether or not the respective commands can be executed, and keywords associated with the respective commands; a voice acquisition unit that acquires voice data; a control unit that controls the control device; and a communication unit that communicates with the projector. The control unit determines whether or not each of the commands for the projector can be executed on the basis of state information of the projector, the state information being acquired through the communication unit from the projector, updates the flags on the basis of a result of determining whether or not each of the commands can be executed, generates character string information from voice data acquired by the voice acquisition unit, acquires a command in which an executable flag is set from the storage unit using the character string information as a search key, and transmits the acquired command through the communication unit to the projector.

In an aspect, after updating the flag of each command, the control unit creates a table obtained by extracting a command in which an executable flag is set from the plurality of commands, and searches the table using the character string information as a search key.

In an aspect, alter the communication unit transmits a command to the projector, the control unit requests the state information from the projector.

In an aspect, the storage unit includes a command execution condition table that manages executable conditions for each command. The control unit determines whether or not the received state information satisfies the executable conditions for each command, and updates the flag of each command on the basis of a result of the determination.

In an aspect, the state information includes direction information of an image projected by the projector. The command execution condition table includes a projectable range based on right ascension and declination at which each command can be executed. The control unit determines whether or not the current projection area by the projector is included in the projectable range of each command on the basis of the direction information included in the received state information, and updates the flag of each command on the basis of a result of the determination In an aspect, the state information includes date information of an image projected by the projector. The command execution condition table includes information on a range of a date when each command can be executed. The control unit determines whether or not the date of the current projection information by the projector is included in the information on a range of a date of each command on the basis of the date information included in the received state information, and updates the flag of each command on the basis of a result of the determination.

In an aspect, the state information includes time zone information of an image projected by the projector. The command execution condition table includes information on a range of a time when each command can be executed. The control unit determines whether or not the time zone of the current projection information by the projector is included in the information on a range of a time of each command on the basis of the time zone information included in the received state information, and updates the flag of each command on the basis of a result of the determination.

In an aspect, the state information includes operation information of the projector. The command execution condition table includes a list of commands that can be used simultaneously with each operation of the projector. The control unit determines whether or not each command can be executed in the current operation situation of the projector on the basis of the operation information included in the received state information, and updates the flag of each command on the basis of a result of the determination.

in an aspect, the storage unit includes a command group that executes a plurality of commands in succession. The command execution condition table includes a list of commands that can be used simultaneously with the command group. The control unit determines whether or not each command can be executed simultaneously with the transmitted command group on the basis of transmission of the command group to the projector, and updates the flag of each command on the basis of a result of the determination.

In an aspect, the state information includes a usage state of an automatic dimming mode in the projector. The command execution condition table includes a list of commands that can be used simultaneously with the automatic dimming mode. The control unit determines whether or not each command can be executed on the basis of a usage state of the automatic dimming mode included in the received state information, and updates the flag of each command on the basis of a result of the determination.

In an aspect, the projector includes a celestial body projection unit to which any celestial body can be assigned. The command execution condition table includes a list of commands that can be executed for each celestial body assigned to the celestial body projection unit. The control unit determines whether or not each command can be executed on the basis of a celestial body assigned to the celestial body projection unit, and updates the flag of each command on the basis of the determination.

In an aspect, the command execution condition table includes a list of commands that can be executed for each external apparatus connected to the projector. The control unit determines whether or not each command can be executed on the basis of an external apparatus connected to the projector, and updates the flag of each command on the basis of a result of the determination.

In an aspect, the command execution condition table includes a plurality of executable conditions for each command. The control unit determines whether or not the plurality of executable conditions for each command is satisfied on the basis of the received state information, and updates the flag of each command when a result of the determination satisfies some of the plurality of executable conditions.

In an aspect, the control unit requests the state information from the projector on the basis of the update of the command execution condition table.

According to another embodiment, a method for controlling a projector of a planetarium is provided. This control method includes: a step of acquiring state information of a projector; a step of determining a command that can be executed from a plurality of commands that controls the projector on the basis of the acquired state information of the projector; a step of acquiring voice data; a step of searching for a command associated with a word included in the acquired voice data from the commands that can be executed and acquiring an execution command to operate the projector; and a step of transmitting the execution command to the projector.

According to still another embodiment, a program for controlling a projector of a planetarium is provided. This program causes a projector to execute: a step of acquiring state information of the projector; a step of determining a command that can be executed from a plurality of commands that controls the projector on the basis of the acquired state information of the projector; a step of acquiring voice data: a step of searching for a command associated with a word included in the acquired voice data from the commands that can be executed and acquiring an execution command to operate the projector; and a step of transmitting the execution command to the projector.

Advantageous Effects of Invention

The present technology can provide quick-responsive voice control even in use in a planetarium.

The above and other objects, features, aspects, and advantages of the present invention will become apparent from the following detailed description of the invention to be understood in connection with the attached drawings.

BRIEF DESCRIPTION OF DRAWINGS

FIG. 5 is a diagram illustrating an example of a configuration of a projector management table 309.

FIG. 6 is a diagram illustrating an example of a configuration of a command master table 310.

FIG. 7 is a diagram illustrating an example of a configuration of an executable command table 311.

FIG. 8 is a flowchart illustrating an example of a search information update process of the control device 100 according to an embodiment.

DESCRIPTION OF EMBODIMENTS

Figure 1:
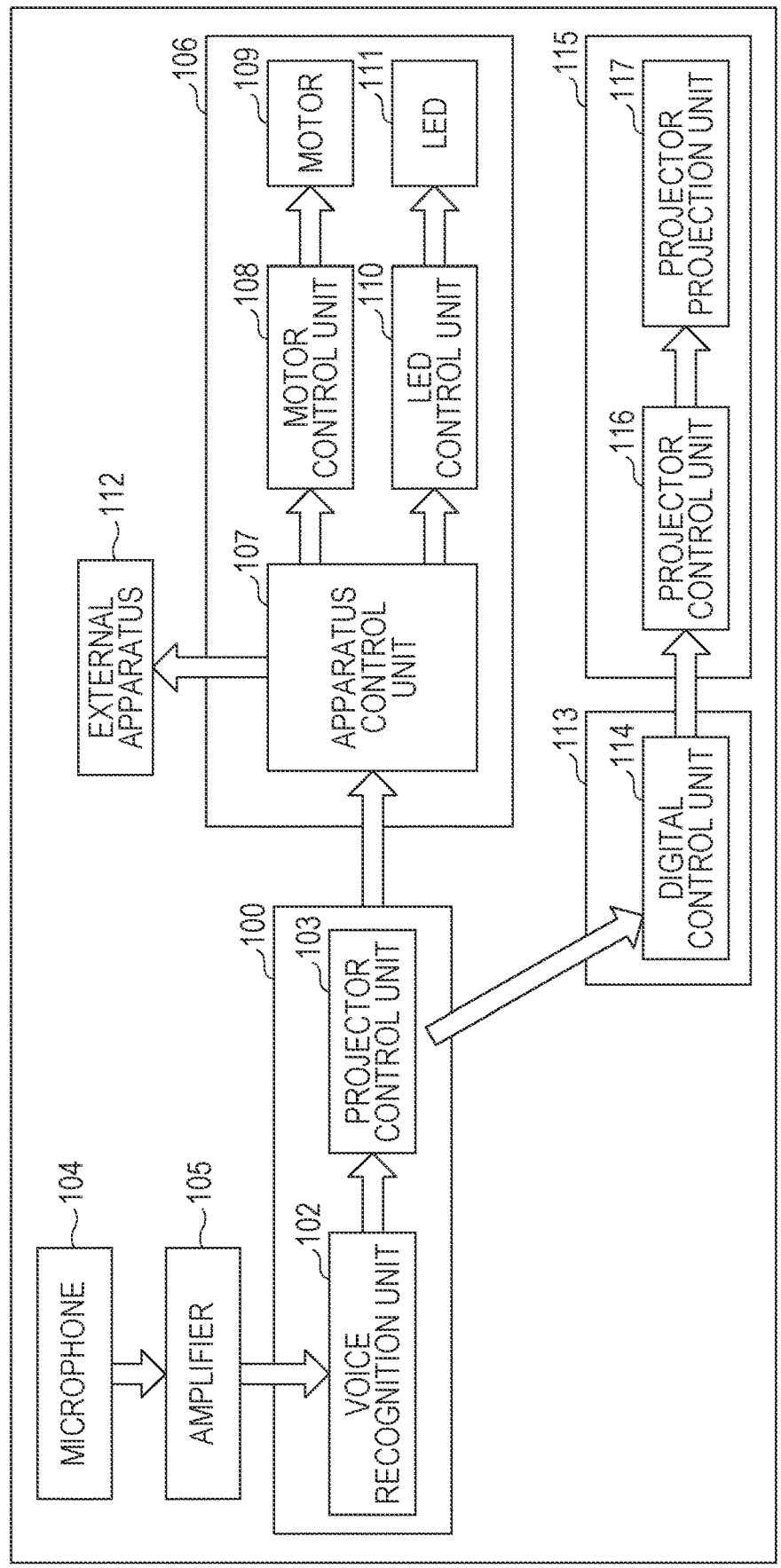
FIG. 1 is a diagram illustrating an example of a configuration of a planetarium system 10 according to an embodiment.

Hereinafter, an embodiment of a technical idea according to the present disclosure will be described with reference to the drawings. In the following description, the same parts are denoted by the same reference numeral. The names thereof and the functions thereof are also the same. Therefore, detailed description thereof will not be repeated.

<A. Configuration of Planetarium System>

FIG. 1 is a diagram illustrating an example of a configuration of a planetarium system 10 according to the present embodiment. In the planetarium system 10 according to the present embodiment, it is possible to perform quick-responsive voice control even in a situation where the situation changes from moment to moment and a command to be searched for changes.

With reference to FIG. 1, the planetarium system 10 according to the present embodiment will be described. The planetarium system 10 includes a control device 100, a microphone 104, an amplifier 105, an optical planetarium projector 106, an external apparatus 112, a digital planetarium projector control device 113, and a digital planetarium projector 115.

The control device 100 includes a voice recognition unit 102 and a projector control unit 103. The optical planetarium projector 106 includes an apparatus control unit 107, a motor control unit 108, a motor 109, a light emitting diode (LED) control unit 110, and an LED 111. The digital planetarium projector control device 113 includes a digital control unit 114. The digital planetarium projector 115 includes a projector control unit 116 and a projector projection unit 117.

Note that the planetarium system 10 does not necessarily have to include the external apparatus 112. The planetarium system 10 may selectively include the optical planetarium projector 106, or the digital planetarium projector control device 113 and the digital planetarium projector 115, or may include both of these.

The control device 100 operates each projector by voice control. The control device 100 captures voice information of a commentator and generates text information from the captured voice information. The control device 100 is used to search for a command that transmits text information to each projector. The control device 100 transmits the command that has been searched for on the basis of the text information to each projector.

The voice recognition unit 102 acquires the voice information of the commentator via the microphone 104 and the amplifier 105. In addition, the voice recognition unit 102 converts the acquired voice information into text, searches for a command, and transmits the command to the projector control unit 103. By transmitting the command acquired from the voice recognition unit 102 to each projector, the projector control unit 103 operates each projector.

In an aspect, the microphone 104 and the amplifier 105 may be included in one voice input apparatus. In an aspect, the voice recognition unit 102 may acquire voice information from a voice input apparatus including the microphone 104 and the amplifier 105 via a cable. In an aspect, the voice recognition unit 102 may acquire voice information from a voice input apparatus including the microphone 104 and the amplifier 105 via radio.

The optical planetarium projector 106 projects a constellation picture or the like on a dome-shaped curved screen. The apparatus control unit 107 controls various apparatuses connected to the optical planetarium projector 106. The apparatus control unit 107 also controls the motor control unit 108 and the LED control unit 110 included. in the optical planetarium projector 106.

The motor control unit 108 drives the motor 109 for operating the optical planetarium projector 106. The LED control unit 110 lights the LED 111 that projects an image. The external apparatus 112 is used by being connected to the optical planetarium projector 106. In an aspect, a lifter, a guide light, an aroma generator, an audio player, a projector, or the like may be used as the external apparatus 112.

The digital planetarium projector control device 113 controls the digital planetarium projector 115. The digital control unit 114 receives a command from the projector control unit 103. In addition, the digital control unit 114 transmits a control signal to the digital planetarium projector 115 on the basis of the received command to operate the digital planetarium projector 115.

The digital planetarium projector 115 uses a projector instead of an LED and a lens unlike the optical planetarium projector 106. The projector control unit 116 controls the projector projection unit 117 on the basis of the control signal received from the digital control unit 114. The projector projection unit 117 projects a constellation picture on the screen.

<B. Hardware Configuration of Control Device 100>

The control device 100 has a function of reducing the number of command searches for quick-responsive voice control. Hereinafter, the control device 100 will be described in detail.

Figure 2:
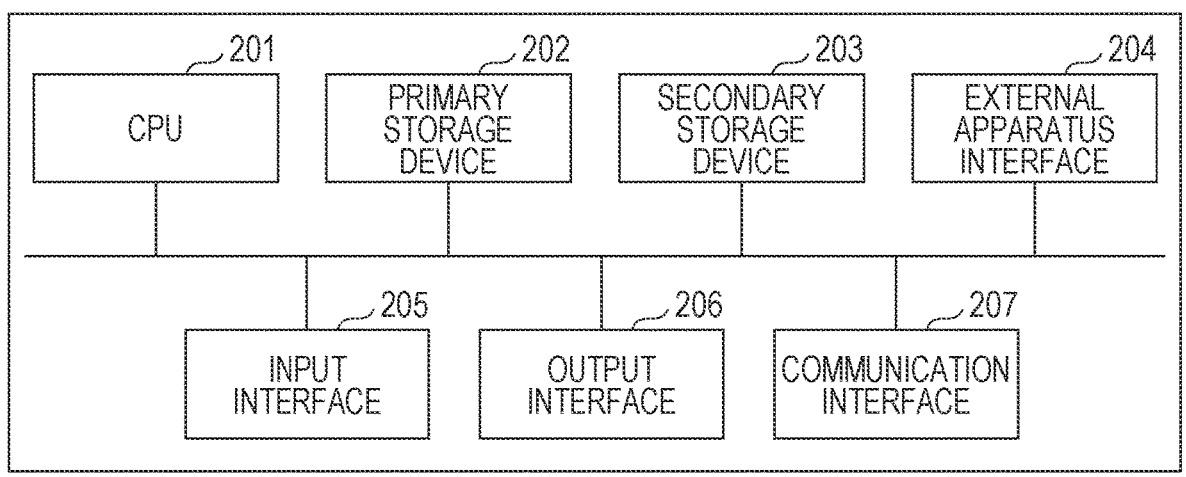
FIG. 2 is a diagram illustrating an example of a hardware configuration of a control device 100.

FIG. 2 is a diagram illustrating an example of a hardware configuration of the control device 100. With reference to FIG. 2, the control device 100 includes a central processing unit (CPU) 201, a primary storage device 202, a secondary storage device 203, an external apparatus interface 204, an input interface 205, an output interface 206, and a communication interface 207.

The CPU 201 processes a program operating in the control device 100 and data. The primary storage device stores a program executed by the CPU 201 and data referred to by the CPU 201. In an aspect, dynamic random access memory (DRAM) may be used as the primary storage device.

The secondary storage device 203 stores a program, data, and the like for a long period of time. Generally, the secondary storage device has a low speed than the primary storage device. Therefore, data directly used by the CPU 201 is put in the primary storage device, and the other data is put in the secondary storage device. In an aspect, a non-volatile storage device such as a hard disk drive (HDD) or a solid state drive (SSD) may be used as the secondary storage device.

The external apparatus interface 204 is used, for example, when an auxiliary device is connected to the control device 100. Generally, a universal serial bus (USB) interface is often used as the external apparatus interface 204. The input interface 205 is used in order to connect a keyboard, mouse, or the like. The USB interface may also be used as the input interface 205.

The output interface 206 is used in order to connect an output device such as a display. In an aspect, as the output interface 206, a high-definition multimedia interface (HDMI) (registered trademark) or a digital visual interface (DVI) may be used.

The communication interface 207 is used in order to communicate with an external communication apparatus. In an aspect, a local area network (LAN) port, a transmitter/receiver of wireless fidelity (Wi-Fi) (registered trademark), or the like may be used as the output interface 206.

In an aspect, the control device 100 may be a personal computer (PC) or a workstation. In an aspect, a program that performs a process described in the following implementation example may be stored in the secondary storage device 203. The program may be read from the secondary storage device 203 to the primary storage device 202 and executed by the CPU 201.

<C. Functions of Control Device 100>

Figure 3:
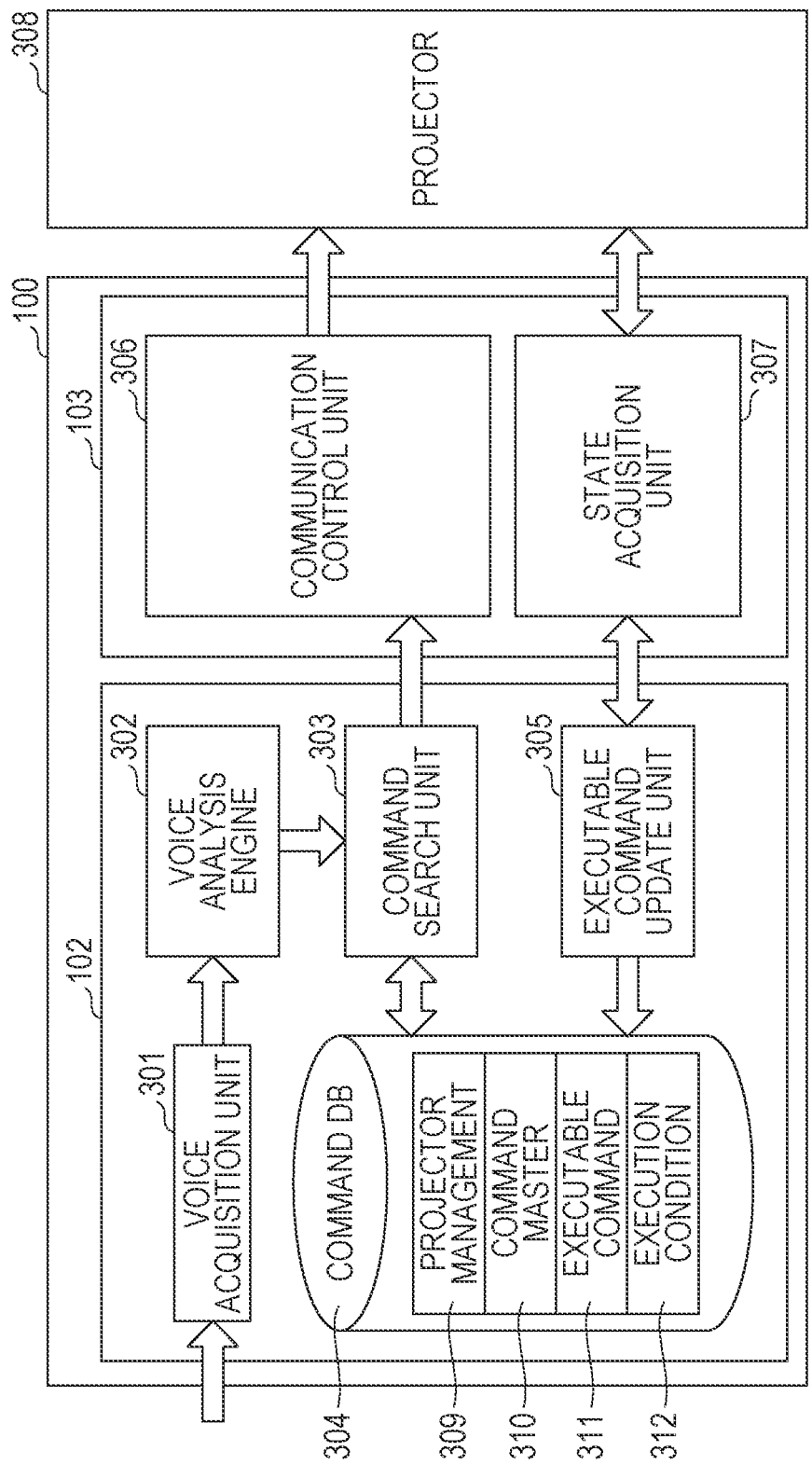
FIG. 3 is a diagram illustrating an example of a functional block of the control device 100.

FIG. 3 is a diagram illustrating an example of a functional block of the control device 100. The control device 100 has a function of searching for a command on the basis of voice of a commentator and transmitting the command that has been searched for to a projector, and a function of updating search information in order to increase a search speed. Hereinafter, the functions of the control device 100, search and execution of a command, and update of search information will be described in this order.

In an aspect, each function of FIG. 3 may be implemented as software or data. In that case, software or data for implementing each function of FIG. 3 may be read from the secondary storage device 203 to the primary storage device 202 and executed by the CPU 201. In an aspect, when the software for implementing each function of FIG. 3 transmits/receives data to/from another device, the CPU 201 may use the external apparatus interface 204, the input interface 205, the output interface 206, and the communication interface 207.

In an aspect, each functional block of FIG. 3 may be implemented as dedicated hardware using an application specific integrated circuit (ASIC), a field-programmable gate army (FPGA), or the like.

(C-1. Functional Block)

With reference to FIG. 3, the control device 100 includes a voice acquisition unit 301, a voice analysis engine 302, a command search unit 303, a command database (hereinafter, referred to as "command DB") 304, an executable command update unit 305, a communication control unit 306, and a state acquisition unit 307. The command DB 304 includes a projector management table 309, a command master table 310, an executable command table 311, and an execution condition table 312. Note that the projector 308 may selectively include the optical planetarium projector 106 of FIG. 1, or the digital planetarium projector control device 113 and the digital planetarium projector 115, or may include both of these. In addition, the projector 308 may include a plurality of projectors.

(C-2. Search and Execution of Command)

Next, the search and execution of a command will be described. Functional blocks used for search and execution of a command are the voice acquisition unit 301, the voice analysis engine 302, the command search unit 303, the command DB 304, and the communication control unit 306.

The voice acquisition unit 301 acquires voice information, for example, from a voice input apparatus having the microphone 104 and the amplifier 105 built therein. In an aspect, the voice acquisition unit 301 may be connected to the voice input apparatus via a cable, or may be connected to the voice input apparatus via a wireless apparatus. The voice acquisition unit 301 transmits the acquired voice information to the voice analysis engine 302. The voice acquisition unit 301 may encode the voice information and convert the voice information into a file format that can be read by the voice analysis engine 302.

The voice analysis engine 302 generates text information from the voice information. For example, a WAV file including voice of "Hello" is analyzed to generate text information of "Hello". The voice information cannot be used for searching a usual relational database or the like. Therefore, the voice information needs to be converted into text information via the voice analysis engine 302. The voice analysis engine 302 transmits the generated text information to the command search unit 303. Alternatively, the voice acquisition unit 301 may acquire the text information from the voice analysis engine 302 and transfer the text information to the command search unit 303.

The command search unit 303 searches the command DB 304 on the basis of the text information acquired from the voice analysis engine 302 (details of the command DB 304 will be described later). The text information does not have to completely include what a commentator says. The command search unit 303 may extract only a specific recognition word from the text information and use the specific recognition word as a search key for the command DB 304. For example, when a commentator says, "Let's look at Orion next. Look at the sky on the right.", there is at least a recognition word "Orion" or "Look at Orion.", a command to be searched for can be specified. When the command search unit 303 acquires a command from the command DB 304, the command search unit 303 transmits the text information to the communication control unit 306.

The communication control unit 306 transmits a command to the projector 308 to be managed to operate the projector 308. The communication control unit 306 transmits a command acquired from the command search unit 303 to the projector 308. The communication control unit 306 may transmit a command to the projector 308 via a cable, or may transmit a command to the projector 308 via a wireless apparatus.

(C-3. Update of Search Information)

Next, update of search information will be described. Functional blocks used to update search information are the command DB 304, the executable command update unit 305, and the state acquisition unit 307. The state acquisition unit 307 acquires the state information of projector 308 from the projector 308 periodically or at a specific timing. The state information may include various states of the projector 308, such as "moving", "projecting Scorpio", and "dimming mode ON/OFF". The state acquisition unit 307 transmits the acquired state information to the executable command update unit 305.

In an aspect, the state acquisition unit 307 may acquire the state information by polling on the projector 308 at regular intervals. In an aspect, the state acquisition unit 307 may acquire the state information from the projector 308 by receiving a command transmission notification from the communication control unit 306 after the communication control unit 306 transmits a command to the projector 308. In an aspect, the communication control unit 306 and the state acquisition unit 307 may use the same communication interface 207.

The executable command update unit 305 updates each table of the command DB 304 on the basis of the acquired state information. First, the executable command update unit 305 updates the projector management table 309. The projector management table 309 is a table that manages a projector related to each command and whether or not a command can be executed. That is, it can be said that the projector management table 309 manages information regarding "which projector can execute what command or not". The executable command update unit 305 creates or updates the projector management table 309 on the basis of the state information.

Next, the executable command update unit 305 refers to the execution condition table 312. The execution condition table 312 includes conditions for determining whether or not all commands can be executed. Examples of an execution condition for projecting a certain constellation picture include "range of longitude/latitude", "time zone", "date (season)", and "projector is not moving". The conditions included in the execution condition table 312 may be one or more for one command.

Next, the executable command update unit 305 updates the command master table 310 on the basis of the updated projector management table 309 and execution condition table 312. The command master table 310 stores all recognition words, commands associated with the respective recognition words, and whether or not the commands can be executed.

The executable command update unit 305 acquires the state of the projector 308 by referring to the updated projector management table 309. In addition, the executable command update unit 305 acquires executable/non-executable conditions for each command by referring to the execution condition table 312. The executable command update unit 305 sequentially rewrites an executable/non-executable flag of each command, the flag being stored in the command master table 310, by comparing the acquired state of the projector 308 and the executable/non-executable conditions for each command.

Finally, the executable command update unit 305 extracts only a record for which the executable/non-executable flag is "enabled (executable)" from. the command master table 310, and creates or updates the executable command table 311. By searching only the executable command table 311 created by extracting a currently executable command, the command search unit 303 can complete search at a higher speed than when the command search unit 303 searches the command master table 310 including all commands.

The number of combinations of executable commands may be enormous depending on a combination of seasons, time zones, and constellations. However, in each scene of a projection program, commands that can be executed are limited. Therefore, the control device 100 can narrow down commands in advance for each scene of a planetarium. For example, suppose that the number of all commands is "1000", and the number of executable commands in a specific season, in a specific time zone, and at a specific latitude/longitude is "10". In this case, the control device 100 can reduce the number of searches to 1/100 by narrowing down search targets in advance according to a current situation. By constantly updating information on a command that can be executed in each scene on the basis of the state information of the projector 308, and reducing the number of searches, the control device 100 can perform quick-responsive voice control of a planetarium.

(C-4. Communication Between Functional Blocks)

Figure 4:
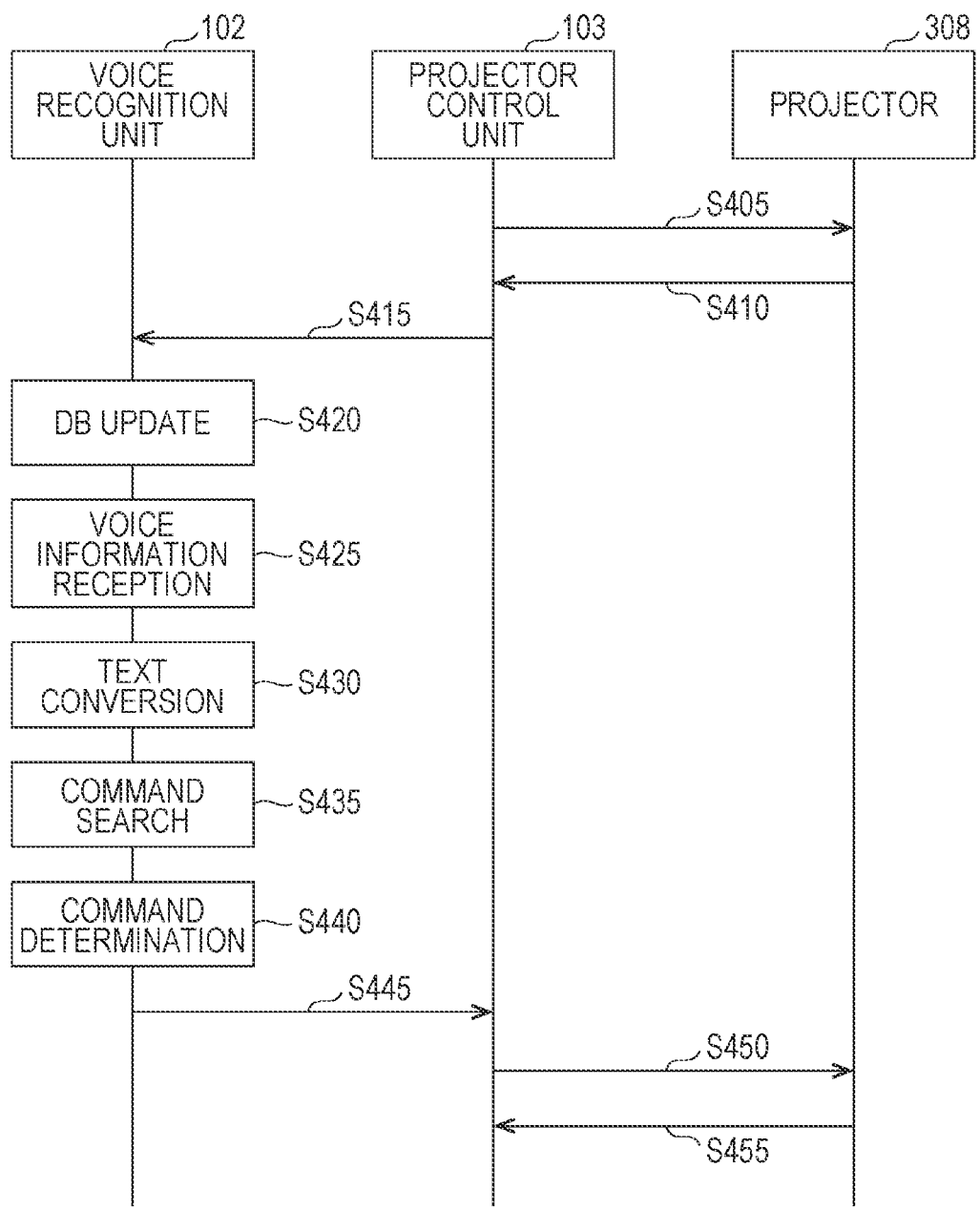
FIG. 4 is a diagram illustrating; an example of a sequence process of the planetarium system 10 according to an embodiment.

FIG. 4 is a diagram illustrating an example of a sequence process of the planetarium system 10 according to the present embodiment. With reference to FIG. 4, a flow of messages between functional blocks will be described. In an aspect, communication between the voice recognition unit 102 and the projector control unit 103 may be socket communication between programs. In an aspect, the voice recognition unit 102 and the projector control unit 103 may be implemented as one piece of software. In an aspect, communication between the projector control unit 103 and the projector 308 may he performed via a cable or a wireless apparatus.

Note that steps S405 to S420 are sequence processes related to update of search information. Steps S425 to S450 are sequence processes related to search and execution of a command.

In step S405, the projector control unit 103 transmits a message requesting state information to the projector 308. In an aspect, the projector control unit 103 may request all pieces of state information possessed by the projector 308, or may selectively request some pieces of the state information. In step S410, the projector 308 returns the requested state information to the projector control unit 103.

In step S415, the projector control unit 103 transmits state information to the voice recognition unit 102. The process in step S415 corresponds to a process in which the state acquisition unit 307 in FIG. 3 transmits the state information to the executable command update unit 305.

In step S420, the voice recognition unit 102 updates the command DB 304 on the basis of the state information received from the projector control unit 103. The process in step S420 corresponds to a process performed by the executable command update unit 305 in FIG. 3. In an aspect, the processes in steps S405 to S420 may be executed separately from steps S425 to S450, periodically or at a specific timing (for example, immediately after the projector control unit 103 transmits a command to the projector 308).

In step S425, the voice recognition unit 102 acquires voice information of a commentator via a voice input apparatus. In an aspect, the voice input apparatus may be included in the control device 100, or may be an apparatus different from the control device 100. The process in step S425 corresponds to a process from a time when the voice acquisition unit 301 of FIG. 3 acquires the voice information to a time when the voice acquisition unit 301 transmits the information to the voice analysis engine 302.

In step S430, the voice recognition unit 102 generates text information from the voice information. The process in step S425 corresponds to a process from a time when the voice analysis engine 302 of FIG. 3 generates the text information from the voice information to a time when the voice analysis engine 302 transmits the text information to the command search unit 303.

In step S435, the voice recognition unit 102 searches for a command to be executed on the basis of the text information. The process in step S425 corresponds to a process in which the command search unit 303 of FIG. 3 searches the executable command table 311 of the command DB 304. In an aspect, the command search unit 303 may extract any word from the text information and use the extracted word as a search key.

In step S440, the voice recognition unit 102 determines a command to be transmitted to the projector 308. In an aspect, the voice recognition unit 102 may select a command on the basis of a predetermined priority when there are two or more executable commands as a search result. In an aspect, the voice recognition unit 102 may select all of the plurality of executable commands. In an aspect, the voice recognition unit 102 may display candidates for the plurality of executable commands on a display of a terminal device of a commentator or the control device 100, and determine a command on the basis of input contents of the commentator to the control device 100.

In step S445, the voice recognition unit 102 transmits a command to the projector control unit 103. In step S450, the projector control unit 103 transmits a command to the projector 308 to operate the projector 308. In step S455. the projector 308 returns a message notifying that a command has been received. In an aspect, the projector 308 does not have to return a message notifying that a command has been received.

<D. Various Tables>

FIG. 5 is a diagram illustrating an example of a configuration of the projector management table 309. With reference to FIG. 5, the projector management table 309 includes an execution command 501, corresponding projector information 502, and an executable/non-executable flag 503.

The execution command 501 is a command transmitted to the projector 308. The corresponding projector information 502 is information on the projector 308 that executes each command in a column of the execution command 501. For example, the projector 308 that executes an execution command "lighting of Orion" is an "Orion constellation picture projector". Since an execution command "time movement" can be executed by any projector 308, a corresponding projector is "-(blank)" indicating all projection apparatuses. The executable/non-executable flag 503 indicates whether or not an execution command of each record in the projector management table 309 can be executed.

The projector management table 309 is updated by the executable command update unit 305 of FIG. 3 on the basis of state information of the projector 308 to be managed. It can be said that the projector management table 309 stores information on whether or not "which projector" can execute "what command" currently.

FIG. 6 is a diagram illustrating an example of a configuration of the command master table 310. With reference to FIG. 6, the command master table 310 includes a recognition word 601, an execution command 602, and a search enabled flag 603. The recognition word 601 is a character string that triggers execution of the execution command 602. The execution command 602 is a command executed by the projector 308.

The search enabled flag indicates whether or not a record is a search target of the command search unit 303. A record for which the search enabled flag is "enabled" is a search target of the command search unit 303. A record for which the search enabled flag is "disabled" is not a search target of the command search unit 303. The search enabled flag 603 is updated by the executable command update unit 305 on the basis of the projector management table 309 and the execution condition table 312. The search enabled flag 603 is updated to "enabled" when the projector 308 can execute the execution command 602 currently, and updated to "disabled" when the projector 308 cannot execute the execution command 602 currently.

The command master table 310 stores all combinations of a recognition word and an execution command registered in the control device 100. The executable command update unit 305 updates the search enabled flag 603 periodically or at a specific timing. Therefore, it can be said that the command master table 310 stores information on whether or not all the execution commands 602 can be executed (whether or not all the execution commands 602 are search targets).

FIG. 7 is a diagram illustrating an example of a configuration of the executable command table 311. With reference to FIG. 7, the executable command table 311 includes a recognition word 701, an execution command 702, and a search enabled flag 703. The executable command table 311 is obtained by extracting only a record for which the search enabled flag 603 is "enabled" from the command master table 310. The command search unit 303 obtains a search result at a high speed by referring only to the executable command table 311.

In an aspect, the projector management table 309, the command master table 310, and the executable command table 311 may be relational database tables or may be stored in the secondary storage device 203 of the control device 100.

<E. Flow of Voice Control Process>

FIG. 8 is a flowchart illustrating an example of a search information update process of the control device 100 according to the present embodiment. With reference to FIG. 8, a procedure in which the control device 100 updates a search target will be described. In an aspect, a program corresponding to the flow of FIG. 8 may be read from the secondary storage device 203 of the control device 100 of FIG. 2 to the primary storage device 202 and executed by the CPU 201. Hereinafter, each step will be described in the procedure in which the CPU 201 executes the program corresponding to the flow of FIG. 8.

In step S805, the CPU 201 acquires state information of the projector 308 via the communication interface 207. The process in step S805 corresponds to a process from a time when the state acquisition unit 307 of FIG. 3 acquires the state information from the projector 308 to a time when the state acquisition unit 307 transmits the state information to the executable command update unit 305.

In step S810, the CPU 201 updates the command DB 304 stored in the secondary storage device 203 on the basis of the state information. The process in step S810 corresponds to a process from a time when the executable command update unit 305 of FIG. 3 refers to the command DB 304 to a time when the executable command update unit 305 updates the command master table 310.

In step S815, the CPU 201 recreates the executable command table 311 from the command master table 310. The process in step S815 corresponds to a process in which the executable command update unit 305 of FIG. 3 refers to the command DB 304, extracts only a record for which the search enabled flag 603 of the command master table 310 is "enabled", and creates the executable command table 311.

In step S820, the CPU 201 determines whether or not the state of the projector 308 has changed. If there is a change in the state of projector 308 (YES in step S820), the CPU 201 shifts the control to step S805. If there is no change in the state of the projector 308 (NO in step S820), the CPU 201 ends the process.

In an aspect, the CPU 201 may determine that the state of the projector 308 has changed depending on whether or not the CPU 201 has detected transmission of a command to the projector 308. In another aspect, the CPU 201 may acquire state information from the projector 308, compare the acquired state information with the previous state information, and determine whether or not there is a change in the state of the projector 308. The CPU 201 may periodically execute the flow of FIG. 8, or may execute the flow of FIG. 8 using transmission of a command to the projector 308 as a trigger.

As described above, the search information update process performed by the command DB 304, the executable command update unit 305, and the state acquisition unit 307 in FIG. 3 may be implemented as software. When the search information update process is implemented as software, the search information update process can be implemented on various apparatuses such as a PC, a workstation, and a virtual machine on the cloud. In an aspect, a program and a database related to the search information update process can be stored in a storage medium and incorporated into a device to be used or distributed.

Figure 9:
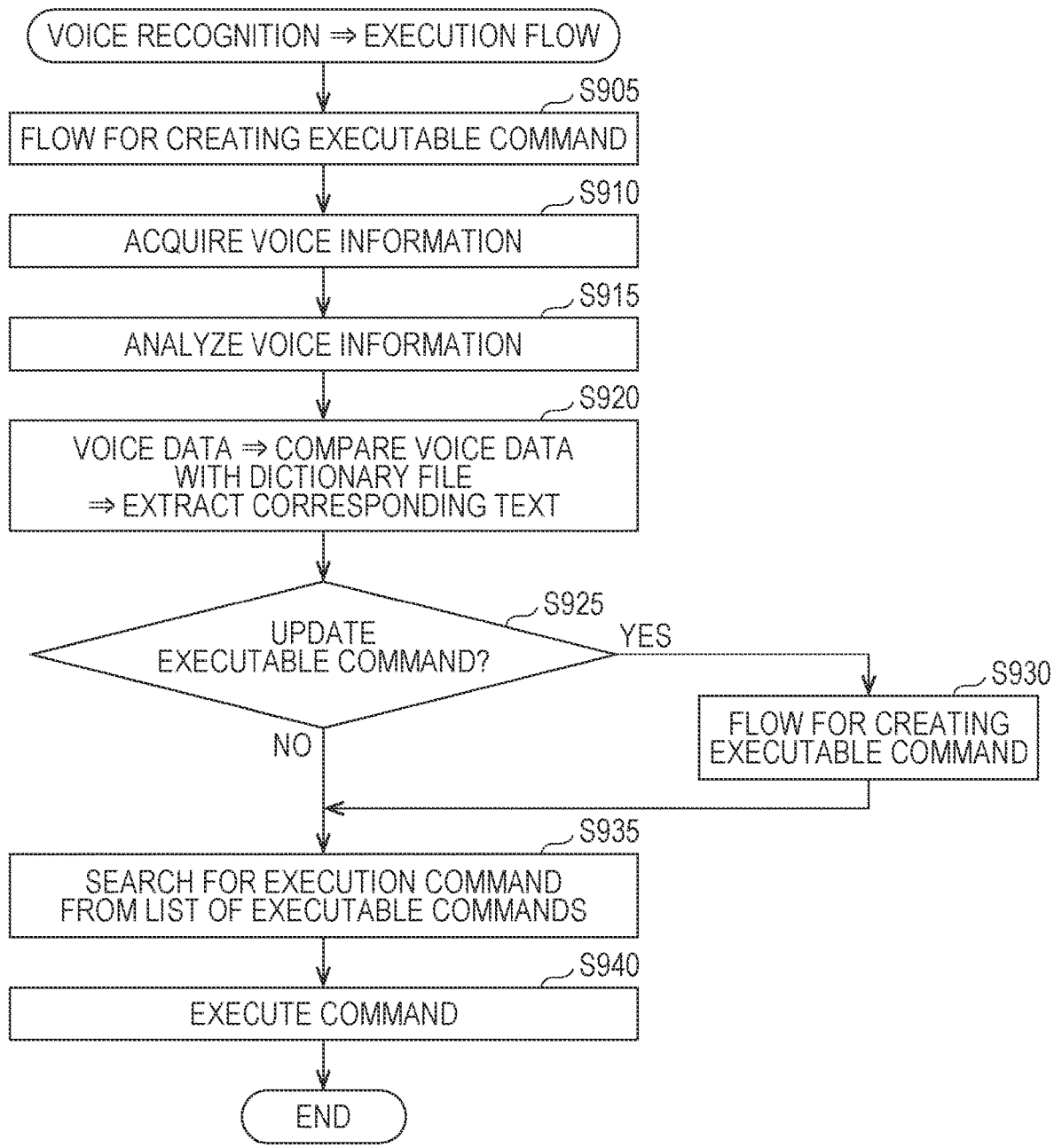
FIG. 9 is a flowchart illustrating an example of a search process of the control device 100 according to an embodiment.

FIG. 9 is a flowchart illustrating an example of a search process of the control device 100 according to the present embodiment. With reference to FIG. 9, a procedure in which the control device 100 searches for a command will be described. In an aspect, a program corresponding to the flow of FIG. 9 may be read from the secondary storage device 203 of the control device 100 of FIG. 2 to the primary storage device 202 and executed by the CPU 201. Hereinafter, each step will be described in the procedure in which the CPU 201 executes the program corresponding to the flow of FIG. 9.

In step S905, the CPU 201 executes the process illustrated in FIG. 8. In an aspect, the process in step S905 does not have to be executed first all the time, and the CPU 201 may execute the process in step S905 at any timing separately from the flow of FIG. 9.

In step S910, the CPU 201 acquires voice information of a commentator via a voice input apparatus. In an aspect, the voice input apparatus may be built in the control device 100 or may be an apparatus different from the control device 100. In an aspect, the control device 100 may communicate with the voice input apparatus by wire or radio. The process in step S910 corresponds to a process to a time when the voice acquisition unit 301 of FIG. 3 transmits the acquired voice information to the voice analysis engine 302.

In steps S915 and S920, the CPU 201 generates text information from the voice information using the voice analysis engine 302 on the primary storage device 202. The process in steps S915 and S920 corresponds to a process from a time when the voice analysis engine 302 of FIG. 3 generates the text information from the voice information to a time when the voice analysis engine 302 transmits the text information to the command search unit 303.

In step S925, the CPU 201 determines whether or not to update the executable command table 311. The process in step S925 does not necessarily have to be executed at the position illustrated in FIG. 9. In an aspect, the CPU 201 may execute the process in step S925 at a stage when the CPU 201 detects that a command has been transmitted to the projector 308.

If the CPU 201 determines that the executable command table 311 needs to be updated (YES in step S925), the CPU 201 shifts the control to step S930. If the CPU 201 does not determine that the executable command table 311 needs to be updated (NO in step S925), the CPU 201 shifts the control to step S935. In step S930, the CPU 201 performs the same process as in step S905.

In step S935, the CPU 201 uses the text information as a search key, refers to the command DB 304 (executable command table 311) stored in the secondary storage device 203, and acquires an execution command. The process in step S935 corresponds to a process from a time when the command search unit 303 of FIG. 3 searches the command DB 304 (executable command table 311) to acquire an execution command to a time when the command search unit 303 transmits the execution command to the communication control unit 306.

In step S940, the CPU 201 transmits a command to the projector 308 via communication interface 207. The process in step S940 corresponds to a process to a time when the communication control unit 306 transmits a command to the projector 308.

As described above, a search and execution process of a command performed by the voice acquisition unit 301, the voice analysis engine 302, the command search unit 303, the command DB 304, and the communication control unit 306 in FIG. 3 may be implemented as software. When the search and execution process of a command is implemented as software, the search and execution process of a command can be implemented on various apparatuses such as a PC, a workstation, and a virtual machine on the cloud. In an aspect, a program and a database related to the search and execution process of the command can be stored in a storage medium and incorporated into a device to be used or distributed.

<F. Application Examples>

Next, application examples of the planetarium system 10 according to the present embodiment will be described. Note that the application examples described in the present embodiment are merely examples, and examples to which the planetarium system 10 can be applied are not limited to the examples described below.

<F-1. Update of Search Information at Specific Latitude/Longitude>

Figure 10:
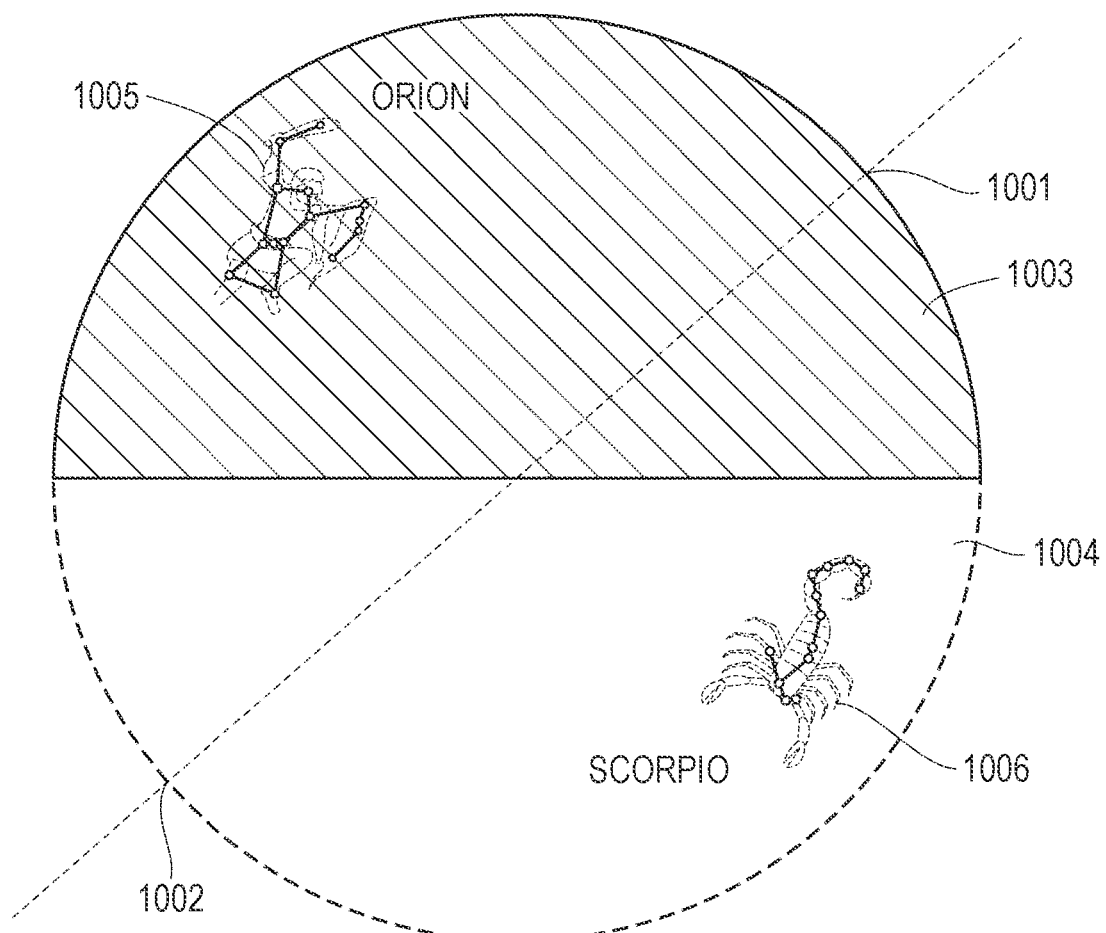
FIG. 10 is a diagram illustrating an example of projection information at a specific latitude/longitude in the planetarium system 10 according to an embodiment.

FIG. 10 is a diagram illustrating an example of projection information at a specific latitude/longitude in the planetarium system 10 according to the present embodiment. With reference to FIG. 10, the projection information includes a North Pole 1001, a South Pole 1002, a projectable area 1003, and a non-projectable area 1004.

The North Pole 1001 and the South Pole 1002 correspond to directions of the North Pole and the South Pole as seen from the earth. The projector 308 calculates the latitude/longitude of the center of a currently projected area, the projectable area 1003, and the non-projectable area 1004 on the basis of the North Pole 1001 and the South Pole 1002.

In the example of FIG. 10, the Orion 1005 is located in the projectable area 1003. Meanwhile, Scorpio 1006 is located in the non-projectable area 1004. In this case, a command for the Orion 1005 can be executed, but a command for the Scorpio 1006 cannot be executed.

The control device 100 acquires state information including latitude/longitude information or direction information in the range projected by the projector 308 with the state acquisition unit 307. Next, the control device 100 updates the executable command table 311 with the executable command update unit 305, enables search for a command related to the Orion 1005, and disables search for a command related to the Scorpio 1006.

Figure 11:
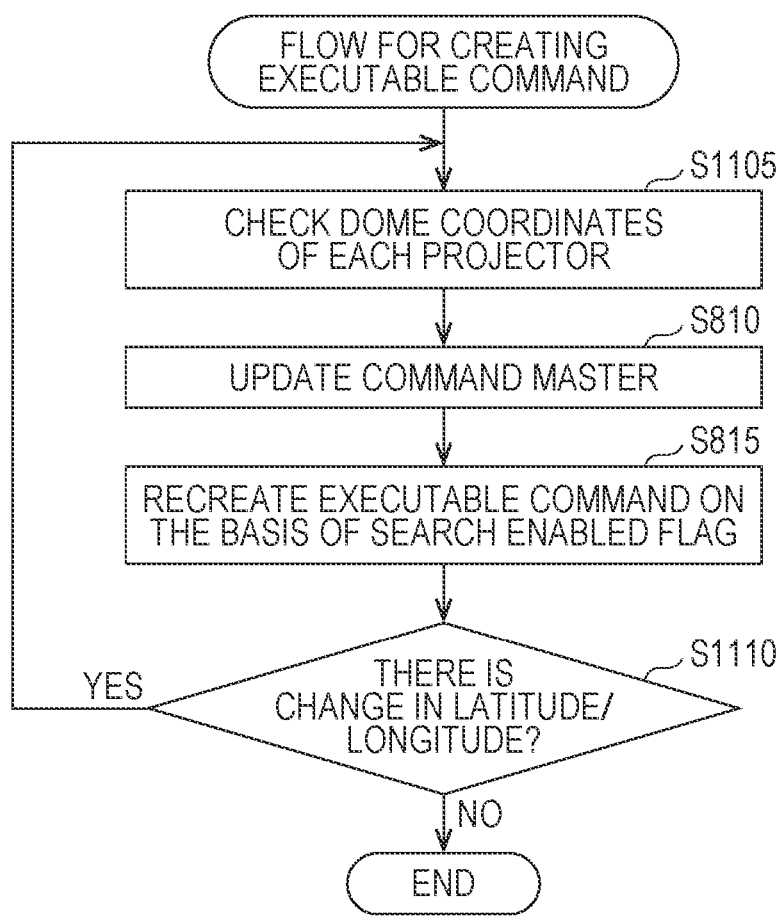
FIG. 11 is a flowchart illustrating an example of a search information update process of the control device 100 on the basis of latitude/longitude.

FIG. 11 is a flowchart illustrating an example of a search information update process of the control device 100 on the basis of latitude/longitude. The flowchart of FIG. 11 is a process in which the change in state is "latitude/longitude" in the flowchart of FIG. 8. In an aspect, a program corresponding to the flow of FIG. 11 may be read from the secondary storage device 203 of the control device 100 of FIG. 2 to the primly storage device 202 and executed by the CPU 201. Hereinafter, each step will be described in the procedure in which the CPU 201 executes the program corresponding to the flow of FIG. 11.

In step S1105, the CPU 201 acquires state information including coordinate information of an image currently being projected on the dome from the projector 308 via the state acquisition unit 307. Note that in an aspect, the CPU 201 may acquire the longitude/latitude of each constellation from the projector 308.

In step S1110, the CPU 201 determines whether or not there is a change in the state of the projector 308 (change in latitude/longitude). If there is a change in latitude/longitude (YES in step S1110), the CPU201 shifts the control to step S1105, If there is no change in latitude/longitude (NO in step S1110), the CPU201 ends the process. By the process of FIG. 11, the CPU 201 generates the executable command table 311 including only a command related to a constellation picture in the projectable area 1003 at a specific latitude/longitude.

(F-2. Update of Search Information on Specific Date)

Figure 12A:
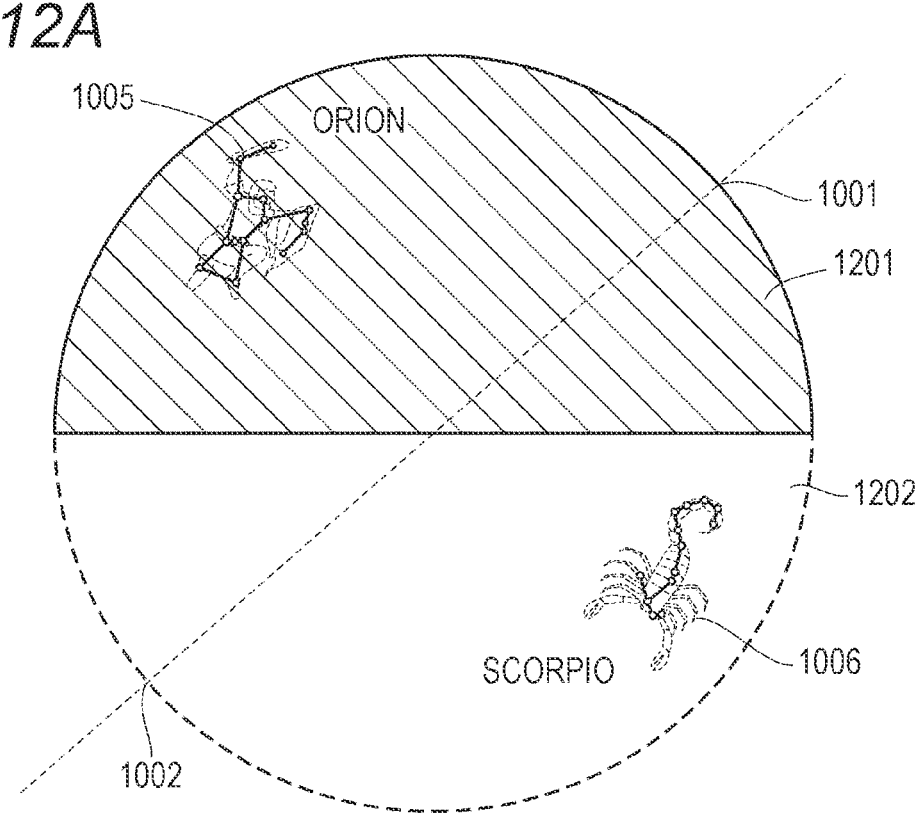
FIG. 12 is a diagram illustrating an example of projection information on a specific date in the planetarium system 10 according to an embodiment.
Figure 12B:
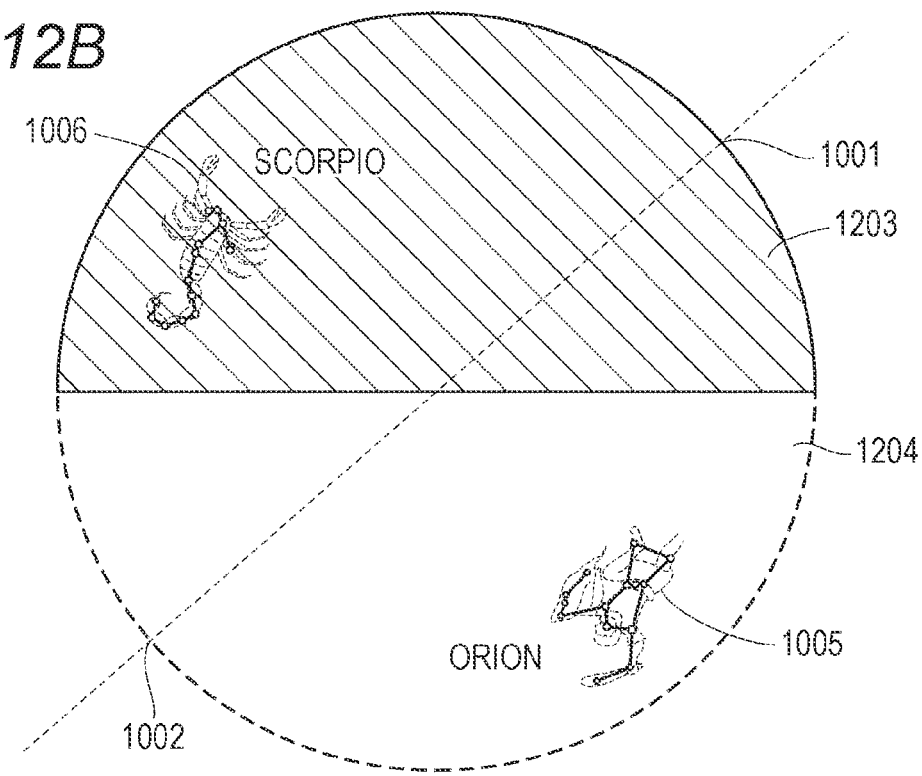

FIG. 12 is a diagram illustrating an example of projection information on a specific date in the planetarium system 10 according to the present embodiment. FIGS. 12A and 12B are obtained by projecting the night sky at the same "latitude/longitude" on different dates.

In FIG. 12A, the Orion 1005 is located in a projectable area 1201, and the Scorpio 1006 is located in a non-projectable area 1202. Meanwhile, in FIG. 12B, the Scorpio 1006 is located in a projectable area 1203, and the Orion 1005 is located in a non-projectable area 1204.

As illustrated in FIG. 12, a constellation that can be projected changes depending on the date. Therefore, it can be seen that it is desirable for the control device 100 to update search information on the basis of a date each time the date of the projection information changes.

In this case, the control device 100 acquires state information including current date information of the projector 308 with the state acquisition unit 307. Next, the control device 100 updates the executable command table 311 with the executable command update unit 305, and enables search only for a command related to a constellation picture in the projectable area on the current date.

Figure 13:
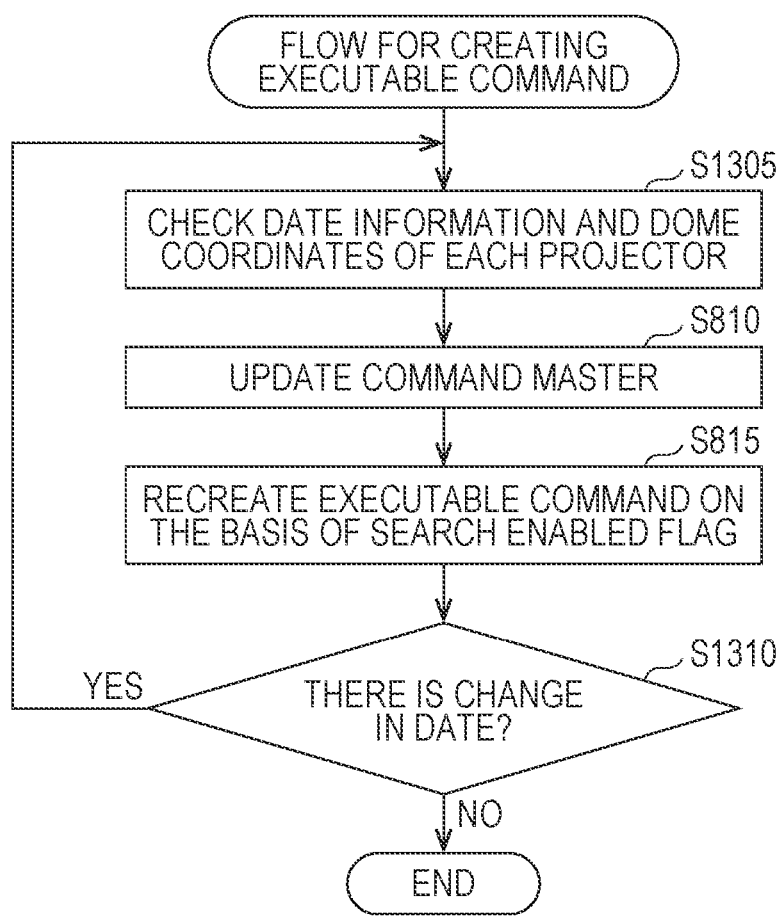
FIG. 13 is a flowchart illustrating an example of a search information update process of the control device 100 on the basis of a date.

FIG. 13 is a flowchart illustrating an example of a search information update process of the control device 100 on the basis of a date. The flowchart of FIG. 13 is a process in which the change in state is "date" in the flowchart of FIG. 8. In an aspect, a program corresponding to the flow of FIG. 13 may be read from the secondary storage device 203 of the control device 100 of FIG. 2 to the primary storage device 202 and executed by the CPU 201. Hereinafter, each step will be described in the procedure in which the CPU 201 executes the program corresponding to the flow of FIG. 13.

In step S1305, the CPU 201 acquires state information including the date of an image currently being projected on the dome from the projector 308 via the state acquisition unit 307. Note that in an aspect, the CPU 201 may acquire information indicating a time zone such as "14:30" or "noon" from the projector 308 together with the date.

In step S1310, the CPU 201 determines whether or not there is a change in the state of the projector 308 (change in date). If there is a change in date (YES in step S1310), the CPU 201 shifts the control to step S1305. If there is no change in date (NO in step S1310), the CPU201 ends the process. By the process of FIG. 13, the CPU 201 generates the executable command table 311 including only a command related to a constellation picture in the projectable areas 1201 and 1203 on a specific date.

(F-3. Search for Command in Other Cases)

Next, another application example of the planetarium system 10 according to the present embodiment will be described. The control device 100 may acquire "states of the motor 109 and the LED 111" as state information of the projector 308. Assuming that the projector 308 is moving due to the previous command, the CPU 201 determines that the projector 308 is moving from the acquired state information. In this case, the CPU 201 disables a command related to movement of the projector 308 and enables a command related to dimming. Assuming that the projector 308 changes the brightness of projection by the LED 109 or the projector projection unit 117 due to the previous command, the CPU 201 determines that the projector 308 is in a dimming operation from the acquired state information. In this case, the CPU 201 disables a command related to dimming of the projector 308 and enables a command related to movement.

The control device 100 may acquire "reproduction state of a specific program or macro" as state information of the projector 308. When the projector 308 is playing a specific program or macro due to the previous command, the CPU 201 enables only commands "pause of macro or program", "play of macro or program during pause", and "end of macro or program mode" on the basis of the acquired state information.

The control device 100 may acquire "ON/OFF state of month sunset glow automatic dimming mode" as state information of the projector 308. The morning/sunset glow automatic dimming mode is a mode that automatically performs dimming control such as morning glow in the morning, sunset glow in the evening, and turning off fixed stars in the daytime according to movement of the sun. When the morning/sunset glow automatic dimming mode of the projector 308 is ON clue to the previous command, the CPU 201 enables only commands "instruction to turn off morning/sunset glow automatic dimming mode" and "other than a dimming-based operation" on the basis of the acquired state information.

The control device 100 may acquire "celestial body information assigned to a celestial body projection unit" as state information of the projector 308. The optical planetarium projector 106 includes a plurality of celestial body projection units (not illustrated), and can assign any celestial body to these celestial body projection units. The CPU 201 enables only a command related to "celestial body information assigned to a celestial body projection unit" on the basis of the acquired state information.

The control device 100 may acquire "information on a connected apparatus connected to the projector 308" as state information of the projector 308. In an aspect, a lifter, a guide light, each projector, an aroma generator, an audio player, a projector, and the like may be connected to the projector 308. The CPU 201 enables only a command related to "connected apparatus connected to the projector 308" on the basis of the acquired state information.

When the control device 100 determines whether search for a command is enabled/disabled, in a case where there is a plurality of determination conditions, if only one of the conditions is satisfied, the control device 100 may enable search for the command. Alternatively, when the control device 100 determines whether search for a command is enabled/disabled, only in a case where all the determination conditions are satisfied, the control device 100 may enable search for the command. When a parameter of the projector 308 is changed during search, the control device 100 may acquire state information from the projector 308 and update search information.

It should be considered that the embodiment disclosed here is illustrative in all respects and not restrictive. The scope of the present invention is defined not by the above description but by the claims and intends to include all modifications within meaning and scope equivalent to the claims.

REFERENCE SIGNS LIST

10 Planetarium system
100 Control device
102 Voice recognition unit
103 Projector control unit
104 Microphone
105 Amplifier
106 Optical planetarium projector
107 Apparatus control unit
108 Motor control unit
109 Motor
110 LED Control unit
112 External apparatus
113 Digital planetarium projector control device 114 Digital control unit
115 Digital planetarium projector
116 Projector control unit
117 Projector projection unit
202 Primary storage device
203 Secondary storage device
204 External apparatus interface
205 Input interface
206 Output interface
207 Communication interface
301 Voice acquisition unit
302 Voice analysis engine
303 Command search unit
304 Command DB
305 Executable command update unit
306 Communication control unit
307 State acquisition unit
308 Projector
309 Projector management table
310 Command master table
311 Executable command table
312 Execution condition table
501, 602, 702 Execution command
502 Corresponding projector information
503 Executable/non-executable flag
601, 701 Recognition word
603, 703 Search enabled flag
1001 North Pole
1002 South Pole
1003, 1201, 1203 Projectable area
1004, 1202, 1204 Non-projectable area
1005 Orion
1006 Scorpio.

The invention claimed is:

1. A control device that controls a projector of a planetarium, the control device comprising:
 a storage that stores a plurality of commands for controlling an operation of the projector, flags indicating whether or not the respective commands can be executed, and keywords associated with the respective commands;
 a voice acquisitor that acquires voice data;
 a hardware processor that controls the control device; and
 a communicator that communicates with the projector, wherein
 the hardware processor
 determines whether or not each of the commands for the projector can be executed on the basis of state information of the projector, the state information being acquired through the communicator from the projector,
 updates the flags on the basis of a result of determining whether or not each of the commands can be executed,
 generates character string information from voice data acquired by the voice acquisitor,
 extracts at least one command in which an executable flag is set from the storage to create or update an executable command table that includes at least one command in which an executable flag is set and does not include any command in which a non-executable flag is set,
 searches the executable command table using the character string information as a search key to acquire a command in which the executable flag is set, and
 transmits the acquired command through the communicator to the projector.

2. The control device according to claim 1, wherein after the communicator transmits a command to the projector, the hardware processor requests the state information from the projector.

3. The control device according to claim 1, wherein
 the storage includes a command execution condition table that manages executable conditions for each command, and
 the hardware processor
 determines whether or not the received state information satisfies the executable conditions for each command, and
 updates the flag of each command on the basis of a result of the determination.

4. The control device according to claim 3, wherein
 the state information includes direction information of an image projected by the projector,
 the command execution condition table includes a projectable range based on right ascension and declination at which each command can be executed, and
 the hardware processor
 determines whether or not a current projection area by the projector is included in the projectable range of each command on the basis of the direction information included in the received state information, and
 updates the flag of each command on the basis of a result of the determination.

5. The control device according to claim 3, wherein
 the state information includes date information of an image projected by the projector,
 the command execution condition table includes information on a range of a date when each command can be executed, and
 the hardware processor
 determines whether or not the date of the current projection information by the projector is included in the information on a range of a date of each command on the basis of the date information included in the received state information, and
 updates the flag of each command on the basis of a result of the determination.

6. The control device according to claim 3, wherein
 the state information includes time zone information of an image projected by the projector,
 the command execution condition table includes information on a range of a time when each command can be executed, and
 the hardware processor
 determines whether or not the time zone of the current projection information by the projector is included in the information on a range of a time of each command on the basis of the time zone information included in the received state information, and
 updates the flag of each command on the basis of a result of the determination.

7. The control device according to claim 3, wherein
 the state information includes operation information of the projector,
 the command execution condition table includes a list of commands that can be used simultaneously with each operation of the projector, and
 the hardware processor
 determines whether or not each command can be executed in the current operation situation of the projector on the basis of the operation information included in the received state information, and updates the flag of each command on the basis of a result of the determination.

8. The control device according to claim 3, wherein
the storage includes a command group that executes a plurality of commands in succession,
the command execution condition table includes a list of commands that can be used simultaneously with the command group, and
the hardware processor
determines whether or not each command can be executed simultaneously with the transmitted command group on the basis of transmission of the command group to the projector, and
updates the flag of each command on the basis of a result of the determination.

9. The control device according to claim 3, wherein
the state information includes a usage state of an automatic dimming mode in the projector,
the command execution condition table includes a list of commands that can be used simultaneously with the automatic dimming mode, and
the hardware processor
determines whether or not each command can be executed on the basis of a usage state of the automatic dimming mode included in the received state information, and
updates the flag of each command on the basis of a result of the determination.

10. The control device according to claim 3, wherein
the projector includes a celestial body projection part to which any celestial body can be assigned,
the command execution condition table includes a list of commands that can be executed for each celestial body assigned to the celestial body projection part, and
the hardware processor
determines whether or not each command can be executed on the basis of a celestial body assigned to the celestial body projection part, and
updates the flag of each command on the basis of the determination.

11. The control device according to claim 3, wherein
the command execution condition table includes a list of commands that can be executed for each external apparatus connected to the projector, and
the hardware processor
determines whether or not each command can be executed on the basis of an external apparatus connected to the projector, and
updates the flag of each command on the basis of a result of the determination.

12. The control device according to claim 3, wherein
the command execution condition table includes a plurality of executable conditions for each command, and
the hardware processor
determines whether or not the plurality of executable conditions for each command is satisfied on the basis of the received state information, and
updates the flag of each command when a result of the determination satisfies some of the plurality of executable conditions.

13. The control device according to claim 3, wherein the hardware processor requests the state information from the projector on the basis of update of the command execution condition table.

14. A control method for controlling a projector of a planetarium, the control method comprising:
communicating with a storage that stores a plurality of commands for controlling an operation of the projector, flags indicating whether or not the respective commands can be executed, and keywords associated with the respective commands;
acquiring state information of the projector;
determining whether or not each of the commands for the projector can be executed on the basis of the acquired state information of the projector;
updating the flags on the basis of a result of the determining whether or not each of the commands can be executed;
acquiring voice data;
generating character string information from the voice data;
extracting at least one command in which an executable flag is set from the storage to create or update an executable command table that includes at least one command in which an executable flag is set and does not include any command in which a non-executable flag is set;
searching the executable command table using the character string information as a search key to acquire an execution command in which the executable flag is set; and
transmitting the execution command to the projector.

15. A non-transitory recording medium storing a computer readable program that controls a projector of a planetarium, wherein
the program causes the projector to execute:
communicating with a storage that stores a plurality of commands for controlling an operation of the projector, flags indicating whether or not the respective commands can be executed, and keywords associated with the respective commands;
acquiring state information of the projector;
determining whether or not each of the commands for the projector can be executed on the basis of the acquired state information of the projector;
updating the flags on the basis of a result of the determining whether or not each of the commands can be executed;
acquiring voice data;
generating character string information from the voice data;
extracting at least one command in which an executable flag is set from the storage to create or update an executable command table that includes at least one command in which an executable flag is set and does not include any command in which a non-executable flag is set;
searching the executable command table using the character string information as a search key to acquire an execution command in which the executable flag is set; and
transmitting the execution command to the projector.

* * * * *